(12) United States Patent
Iwasaki

(10) Patent No.: US 8,791,354 B2
(45) Date of Patent: Jul. 29, 2014

(54) PHOTOELECTROCHEMICAL CELL

(75) Inventor: Yasukazu Iwasaki, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1204 days.

(21) Appl. No.: 11/569,836

(22) PCT Filed: May 13, 2005

(86) PCT No.: PCT/JP2005/008767
§ 371 (c)(1),
(2), (4) Date: Nov. 30, 2006

(87) PCT Pub. No.: WO2005/117137
PCT Pub. Date: Dec. 8, 2005

(65) Prior Publication Data
US 2008/0286643 A1  Nov. 20, 2008

(30) Foreign Application Priority Data

May 31, 2004 (JP) ................................ 2004-162195

(51) Int. Cl.
*H01L 31/042* (2014.01)
*C25B 9/00* (2006.01)
*C25B 3/00* (2006.01)

(52) U.S. Cl.
USPC ........... 136/243; 136/252; 204/242; 204/252; 429/11

(58) Field of Classification Search
USPC ............ 204/252, 242; 429/111; 136/243, 252
See application file for complete search history.

(56) References Cited

U.S. PATENT DOCUMENTS

| 3,494,842 | A | * | 2/1970 | Respiris | 205/464 |
| 4,927,721 | A | | 5/1990 | Gratzel et al. | |
| 5,084,365 | A | | 1/1992 | Gratzel et al. | |
| 6,864,415 | B2 | * | 3/2005 | Koyanagi et al. | 136/256 |
| 2006/0102468 | A1 | * | 5/2006 | Monzyk et al. | 204/242 |

FOREIGN PATENT DOCUMENTS

| JP | 1-220380 A | 9/1989 |
| JP | 8-290052 A | 11/1996 |
| JP | 11-28331 A | 2/1999 |
| JP | 11-33340 A | 2/1999 |

(Continued)

OTHER PUBLICATIONS

English Translation of JP 11-033340 to Hidekazu.*

(Continued)

*Primary Examiner* — Harry D Wilkins, III
*Assistant Examiner* — Zulmariam Mendez
(74) *Attorney, Agent, or Firm* — Foley & Lardner LLP

(57) ABSTRACT

A photoelectrochemical cell (1) includes an electrolyte container (3) containing an ionic liquid (2), and a partitioning membrane (4) dividing an interior of the electrolyte container (3) into two being a $CO_2$ capturing chamber (7) and a $CO_2$ releasing chamber (8), having side walls opposing each other, with the partitioning membrane (4) in between, either as a carbon electrode (5) and the other as a photoelectrode (6). A redox mediator (B) has different bonding forces to carbon dioxide, as it appears as an oxidant $B_{ox}$ and a reductant $B_{red}$, of which that one which has a greater bonding force serves as an intermediary chemical species carrying carbon dioxide to one of the paired electrodes (5, 6). Over the $CO_2$ releasing chamber (10), an upper wall portion (10) is formed, which has a $CO_2$ take-out port (10A) formed therein, for making use of oxidation and reduction of the redox mediator to achieve separation and concentration of carbon dioxide, converting photo energy of sunlight into electric power.

12 Claims, 15 Drawing Sheets

(56) References Cited

FOREIGN PATENT DOCUMENTS

| JP | 11-169661 A | 6/1999 |
|---|---|---|
| JP | 11-339867 A | 12/1999 |
| JP | 2000-077691 | 3/2000 |

OTHER PUBLICATIONS

Nusbaumer et al., "$Co^{II}(dbbip)_2^{2+}$ Complex Rivals Tri-iodide/Iodide Redox Mediator in Dye-Sensitized Photovoltaic Cells", Journal of Phys. Chem. B, 2001, vol. 105, pp. 10461-10464.

Philias et al., "All-solid-state photoelectrochemical cell based on a polymer electrolyte containing a new transparent and highly electropositive redox couple", Electrochimica Acta, 1999, vol. 44, pp. 2915-2926.

Paul Scovazzo et al., "Electrochemical Separation and Concentration of <1% Carbon Dioxide from Nitrogen", Journal of the Electrochemical Society, vol. 150, No. 5, 2003, pp. D91-D98.

Hidekazu Kasai, "$CO_2$ Electrochemical Separation by Molten Carbonate Technology", Fuel Chemistry Division Preprints, Vol, 47, No. 1, 2002, pp. 69-70.

Hidenori Takenobu, "Research on $CO_2$ Recovery System from Coal Fired Power Plant Flue Gas Using Molten Carbonate Fuel Cell", Chuugoku Denryoku Kabushiki Kaisha Giken Zihou, No. 98, pp. 55-61, 2002.

Notification of Reasons for Refusal in JP Appln No. 2004-162195 dated Dec. 6, 2011.

Decision of Refusal Japanese Patent Application No. 2004-162195 dated Jun. 5, 2012.

* cited by examiner

PHOTOELECTROCHEMICAL CELL

TECHNICAL FIELD

The present invention relates to a photoelectrochemical cell, and in particular, to a photoelectrochemical cell with a function for separation and concentration of carbon dioxide.

BACKGROUND ART

Recent years have observed researches for fixation and isolation of carbon dioxide being under intense study, as well as researches for use of carbon dioxide as a chemical raw material. In any case of research, carbon dioxide had better be collected by separation and concentration from the atmosphere, or from waste or exhaust gases discharged from stationary emission sources typified by a thermal power plant or the like.

For separation and concentration of carbon dioxide, old techniques of membrane separation, adsorption separation, and absorption separation have been based on to forward research and development.

The membrane separation method features a simple facility and operation, a clean process, and a small environmental load. The membrane separation method theoretically gives a possibility of reduced energy for separation, but for separation of carbon dioxide, it has not yet found a separation membrane meeting specifications to be satisfactory, such as of separation coefficient, transmission rate, and working temperature. Like this, in the field of membrane separation, current state is a level of basic studies being made of the separation membrane itself.

The adsorption separation method is implemented as a clean process of dry type that features reduced separation energy for high concentration gases to be the object. The adsorption separation method desorbs gas from adsorbant, making use of a pressure difference in a PSA (Pressure Swing Adsorption) method, a temperature difference in a TSA (Thermal Swing Adsorption) method, or both of them in a PTSA method, while the PSA method is typical for possible contraction of the time cycle. For collection of carbon dioxide from exhaust gases containing a high concentration of carbon dioxide like a waste gas of steel, it is implemented as a dry ice manufacture on a commercial base. However, in application to exhaust gases containing at most about 13% of carbon dioxide like a thermal power plant, too large separation energy constitutes a difficulty.

The absorption separation method is a method using an absorbant that chemically absorbs carbon dioxide, unlike the adsorption. The absorption separation method features a great amount of carbon dioxide to be collected per unit weight of absorbant. It however needs a great deal of energy to have the absorbant release carbon dioxide absorbed therein, as a problem. Even in the field of absorption separation, current state is a level of basic studies being made of new absorbants.

Like this, carbon dioxide separation and concentration techniques based on conventional techniques for separation and concentration, being membrane separation, adsorption separation, and absorption separation have not yet grown to a technical level applicable to separation and concentration of carbon dioxide of low concentration.

On the other hand, carbon dioxide separation and concentration methods by electrochemical measures have grown to be studied as new separation and concentration techniques.

For example, there is a known technology using a molten carbonate type fuel cell for electrochemical concentration of carbon dioxide from exhaust gases (refer to KASAI, H.,: "$CO_2$ electrochemical separation by molten carbonate technology", Prepr Pap Am Chem Soc Div Fuel Chem., Vol. 47, No. 1, pp. 69-70 (2002), and TAKENOBU Hidenori: "Study on a collection system of $CO_2$ from coal fired thermal power plant exhaust gases using a molten carbonate type fuel cell" Chuugoku Denryoku Kabushiki Kaisha Giken Zihou, No. 98, pp. 55-65 (2002)). This technology has a better energy efficiency expectable in comparison with the above-noted PSA method, but is identical thereto in that energy is consumed. Further, not simply carbon dioxide but also oxygen is concurrently separated and concentrated, so that the concentrated gas results in a mixed gas of oxygen and carbon dioxide, requiring a separation of carbon dioxide from the concentrated mixed gas to implement a fixing process of carbon dioxide typified by a reduction of carbon dioxide or the like, thus needing additional energy for the separation. In addition, carbon dioxide from molten carbonate has a high vapor pressure, which disables separation and concentration of carbon dioxide from gases low of carbon dioxide concentration, as another problem.

Under such a condition of research and development for separation and concentration of carbon dioxide, an EMC (Electrochemically Modulated Complexation) has been proposed as a quite new electrochemical separation and concentration method (refer to Scovazzo, P., Koval, C,. Noble, R., "Electrochemical Separation and Concentration of <1% Carbon Dioxide from Nitrogen," J. Electrochem. Soc., vol. 150, no. 5, pp. D91-D98, 2003).

Referring to FIG. 15 that schematically shows an electrochemical cell 200 including a container 203 in which an ionic liquid 202 is put and which is divided by a partitioning membrane 204 to form a $CO_2$ capturing chamber 207 and a $CO_2$ releasing chamber 208 and has electrodes 205 and 206 disposed in the $CO_2$ capturing chamber 207 and the $CO_2$ releasing chamber 208, respectively, the electrochemical separation and concentration method for carbon dioxide first introduces exhaust gases 211 containing carbon dioxide into ionic liquid 202 in the $CO_2$ capturing chamber 207. The $CO_2$ capturing chamber 207 has an emission port 209 formed in an upper wall portion thereof, and the $CO_2$ releasing chamber 208 has a $CO_2$ take-out port 210 formed in an upper wall portion thereof.

Then, it connects an external power supply 220 to the electrode 205 in $CO_2$ capturing chamber 207 and the electrode 206 in $CO_2$ releasing chamber 208, imposing a voltage for oxidation and reduction of a reductant $B_{red}$ and an oxidant $B_{ox}$ of a redox mediator B in ionic liquid 201 and 202. The reductant $B_{red}$ of redox mediator B is bonded, as in formula (1) below, to $CO_2$ in $CO_2$ capturing chamber 207, and transfers the $CO_2$ to the electrode 206 in $CO_2$ releasing chamber 208. Then, the reductant $B_{red}$ of redox mediator B bonded to $CO_2$ is oxidized, as in formula (2) below, thus releasing $CO_2$. Concurrently, redox mediators B not bonded to $CO_2$ also are oxidized, as in formula (3) below, becoming $B_{ox}$.

$$CO_2 + B_{red} \rightarrow CO_2 B_{red} \quad (1)$$

$$CO_2 B_{red} \rightarrow CO_2 B_{ox} + e \quad (2)$$

$$B_{red} \rightarrow B_{ox} + e \quad (3)$$

The redox mediator B oxidized as in formula (2) releases $CO_2$. As in formula (4) below, released CO2 is taken out as CO2 separated from exhaust gas and concentrated.

$$CO_2 B_{ox} \rightarrow CO_2 + B_{ox} \quad (4)$$

The oxidant $B_{ox}$ of redox mediator B permeates through the partitioning membrane 204, returning to the $CO_2$ capturing chamber 207, where it is again reduced as in formula (5) below, to be provided for the capture of $CO_2$.

$$B_{ox} + e \rightarrow B_{red} \quad (5)$$

This method implements electrochemically pumping $CO_2$ to the $CO_2$ releasing chamber 208, achieving separation and concentration. This method allows the separation and concentration of carbon dioxide in a pure state, enabling a separation and concentration also from gases containing a low concentration of carbon dioxide, which is advantageous over separation and concentration methods in the past as a matter of course, and even to the separation and concentration of carbon dioxide using a molten carbonate type fuel cell.

It is noted that the wet-type solar cell (dye-sensitized solar cell) is a known technique, so-called Graetzel cell being known (refer to Japanese Patent Publication No. 2664194 (page 1, FIG. 1)).

DISCLOSURE OF INVENTION

However, such a technique for separation and concentration of carbon dioxide using redox mediator as described is like to techniques before then, as still needing separation energy. Further, as the concentration of carbon dioxide in electrolyte (ionic liquid) is low, the redox mediator non-bonded to carbon dioxide has a higher concentration than the redox mediator bonded to carbon dioxide, whereby a redox cycle routing the formula (3), which is non-contributable to the separation and concentration of carbon dioxide, appears in a greater number of rounds than a redox cycle routing the formula (2) serving for the separation and concentration of carbon dioxide. Therefore, such a fraction of current that does not contribute to separation and concentration of carbon dioxide is consumed as an IR drop encompassing the electrochemical cell and power supply system, with a resultant decrease in current efficiency of supplied power, as a problem. In particular, the current efficiency goes down, as the carbon dioxide concentration is decreased in gases containing carbon dioxide to be separated and concentrated.

Like this, for electrochemical separation and concentration of carbon dioxide, if the electric power available from an external power supply is generated by use of a fossil fuel as in a thermal power plant, it so follows that the procurement of necessary power for separation and concentration of carbon dioxide is bound to an emission of carbon dioxide, which is undesirable, while it is desirable to use power generated at a renewable energy source. However, even in use of power generated by a solar cell for example, the power to be consumed is obtained at a certain generation cost, in addition to that stored power is to be consumed also for vain redox cycle else than separation and concentration of carbon dioxide, costing high, as a problem.

An object of the present invention is to provide a mechanism adapted for a separation and concentration of carbon dioxide with suppressed power consumption relative to the conventional, or with creation of power.

The invention is summarized as a photoelectrochemical cell in which at least one pair of mutually spaced electrodes are disposed in electrolyte containing a redox mediator, at least one electrode of the electrodes being an optical electrode having a photocatalyst configured for light irradiation thereon to produce an excited electron, and the optical electrode is configured to perform oxidation or reduction of the redox mediator in electrolyte for conversion of light energy to electric power, characterized in that the redox mediator is a mediation chemical species such that an oxidant and a reductant exhibit different bonding forces to carbon dioxide, the one exhibiting the higher bonding force carrying carbon dioxide to one of the pair of electrodes.

The electrolyte may preferably have a solvent comprising a nonaqueous solvent or an ionic liquid.

According to the invention, carbon dioxide is photoelectrochemically pumped to a prescribed electrode side by an intermediary chemical species, using light energy, allowing power consumption to be suppressed or power creation to be achieved for separation and concentration of carbon dioxide.

BEST MODE FOR CARRYING OUT THE INVENTION

There will be described into details photoelectrochemical cells according to respective embodiments of the present invention, with reference to the drawings. It however is noted that the drawings are schematic, and respective material layers' thicknesses as well as their ratios or such are different from real ones. For actual thickness or dimension, a decision should thus be made in consideration of the following description. Between the drawings also, there may be involved differences in relationship or ratio of their dimensions, as a matter of course.

(First Embodiment)

Figure 1:
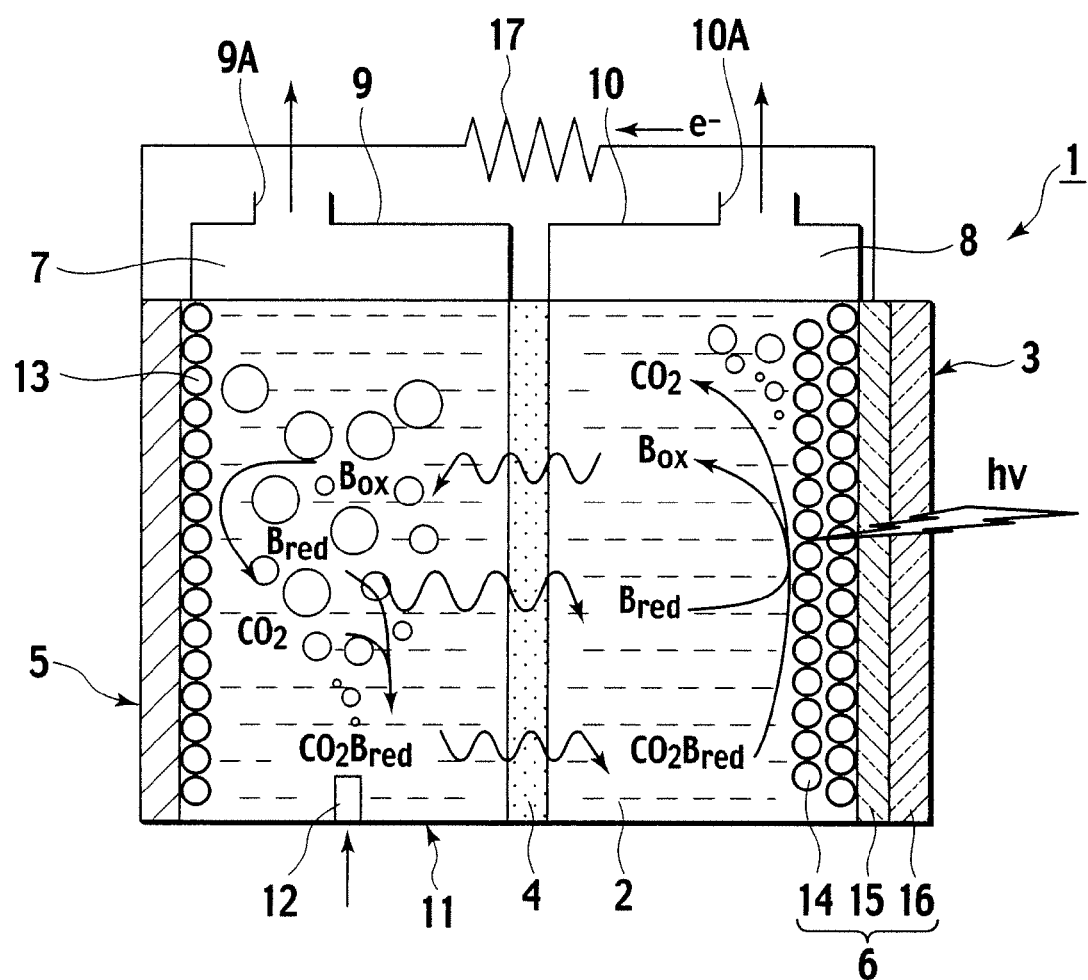
FIG. 1 is a sectional explanatory diagram schematically showing a general configuration of a photoelectrochemical cell according to a first embodiment of the invention.

Description is now made of a photoelectrochemical cell according to a first embodiment of the invention, with reference made to FIG. 1. As shown in FIG. 1, the photoelectrochemical cell 1 according to this embodiment includes an electrolyte container 3 containing an ionic liquid 2 as an electrolyte, and a partitioning membrane 4 dividing an interior of the electrolyte container 3 into two to be a left and a right.

The electrolyte container 3 has opposing sidewalls with the partitioning membrane 4 in between, of which one is made as a carbon electrode 5, and the other as an optical electrode 6.

Further, the electrolyte container 3 is divided into a $CO_2$ capturing chamber 7 and a $CO_2$ releasing chamber 8, with the partitioning membrane 4 in between. Then, over the $CO_2$ capturing chamber 7, an upper wall portion 9 is formed, and an emission port 9A is formed in the upper wall portion 9. Over the $CO_2$ releasing chamber 8, an upper wall portion 10 is formed, and a CO2take-out port 10A is formed in the upper wall portion 10. In a lower wall portion 11 of the $CO_2$ capturing chamber 7, an exhaust gas introducing portion 12 is formed.

The carbon electrode 5, constituting part of the electrolyte container 3, has formed on the inside an electrode catalyst layer 13 made of a catalytic material, such as platinum (Pt).

The optical electrode 6 is formed, in order from inside, by a photocatalyst layer 14 made of a photocatalytic material that produces excited electrons and holes by light typified by sunlight, a collector layer 15 for collecting excited electrons as they are produced in the photocatalyst layer 14, and a transparent glass plate 16 constituting the sidewall of electrolyte container 3.

The partitioning membrane 4 is provided for inhibition of a mixing between exhaust gases bubbling into ionic liquid 2 in the $CO_2$ capturing chamber 7 and $CO_2$ separately concentrated in the $CO_2$ releasing chamber 8, and is made of a porous substance, such as glass or ceramic, allowing an ionic conduction of solvent to be achieved.

In this embodiment, an external load 17 is connected, consuming electric power generated by the photoelectrochemical cell 1. The external load 17 may be a power inverter such as for DC/DC, a power controller, a pump or blower for sending exhaust gases to the $CO_2$ capturing chamber 7, or an electrochemical cell for electrolytic reduction of separately concentrated carbon dioxide, alone or in combination.

Next, description is made of the principle of operation of photoelectrochemical cell 1 according to this embodiment.

(A) First, light typified by sunlight strikes into the glass plate 16, with light energy, whereby, in a vicinity of a surface of photocatalyst constituting the photocatalyst layer 14, electrons in a valence band are photoexcited into a conduction band, producing electron (e)-hole (h) pairs in a vicinity of photocatalyst surface, as shown by formula (6) below.

$$hv \rightarrow e+h \tag{6}$$

(B) Then, produced electron (e)-hole (h) pairs are charge-separated by a band bending caused in a vicinity of photocatalyst surface due to the contact with electrolyte (ionic liquid 2), so that electrons in conduction band are transported to a bulk, thus moving via collector layer 15 to the carbon electrode 5. Holes h are transported to the photocatalyst surface, where they serve for oxidation into an oxidant of a reductant of redox mediator bonded to carbon dioxide, as well as of a reductant of redox mediator non-bonded to carbon dioxide, as shown by formulas (7) and (8) below.

$$CO_2B_{red}+h \rightarrow CO_2B_{ox} \tag{7}$$

$$B_{red}+h \rightarrow B_{ox} \tag{8}$$

(C) Then, carbon dioxide is released from redox mediator B bonded to carbon dioxide, as it is changed to the oxidant, as shown by formula (9) below.

$$CO_2B_{ox} \rightarrow CO_2+B_{ox} \tag{9}$$

(D) Oxidants of redox mediator B of carbon dioxide are diffused in ionic liquid 2, moving to the carbon electrode 5.

(E) Oxidants of redox mediator B of carbon dioxide receive electrons from the carbon electrode 5, whereby they are reduced into reductants, as shown by formula (10) below.

$$B_{ox}+e \rightarrow B_{red} \tag{10}$$

(F) Then, reductants of redox mediator B, which can serve as a carrier for carbon dioxide, are bonded to carbon dioxide introduced into ionic liquid 2, as shown by formula (11) below.

$$CO_2+B_{red} \rightarrow CO_2B_{red} \tag{11}$$

(G) Oxidants of redox mediator B bonded to carbon dioxide, as well as reductants of redox mediator non-bonded to carbon dioxide, are diffused in the ionic liquid, moving to the optical electrode 6.

As the redox mediator B serving as a carrier for carbon dioxide goes around the oxidation-reduction cycle described, carbon dioxide is photoeletrochemically pumped from the $CO_2$ capturing chamber 7 to the $CO_2$ releasing chamber 8, whereby a separating concentration of carbon dioxide is achieved.

In this occasion, the concentration of carbon dioxide in ionic liquid 2 is low, and the redox mediator non-bonded to carbon dioxide has a higher concentration than the redox mediator bonded to carbon dioxide. Therefore, this is like the conventional in that a redox cycle routing the formula (8), which is non-contributable to the separation and concentration of carbon dioxide, appears in a greater number of rounds than a redox cycle routing the formula (7) serving for the separation and concentration of carbon dioxide.

In the photoelectrochemical cell 1 according to this embodiment, however, both the redox cycle that contributes to the separation and concentration of carbon dioxide by the bonding of carbon dioxide and the redox cycle that rounds without bonding carbon dioxide do function to supply energy of light absorbed in the optical electrode 6, as electric energy for external use. They implement a revolutionary function that does not consume power, but per contra converts light energy of sunlight into electric power, performing a separating concentration of carbon dioxide.

It is noted that the difference between a Fermi level of the photocatalyst in use and an oxidation/reduction potential of the redox mediator as a carrier for carbon dioxide provides an open-end voltage (an electromotive force when free of external loads), which is based on for subtraction therefrom of an IR drop as well as an overvoltage of electrode reaction in oxidation/reduction of the redox mediator as a carrier for carbon dioxide to provide a resultant value as an electromotive force.

Figure 10:
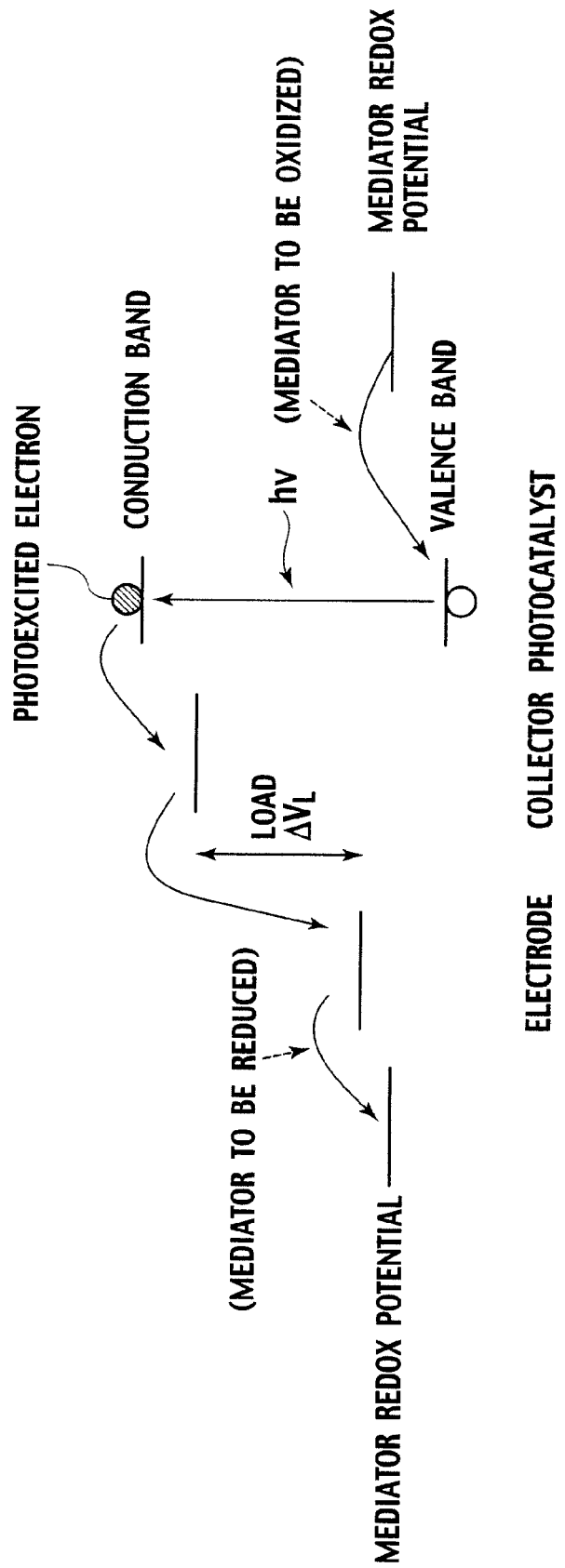
FIG. 10 is an explanatory diagram showing a flow of electron and energy levels in the photoelectrochemical cell according to the first embodiment of the invention.

FIG. 10 is an explanatory diagram illustrating a flow of electron and energy levels of the photoelectrochemical cell 1 according to this embodiment.

It is impossible to implement the function of generating power by sunlight, without consuming power, to perform a separating concentration of carbon dioxide, in those cases in which, like the conventional, simply an external solar cell is provided, and electric power generated by the solar cell is consumed for an oxidation-reduction cycle to achieve the separation and concentration of carbon dioxide. In the conventional case, an electrochemical concentration cell for carbon dioxide and solar cells to be assembled might have some capacities allowing an external supply of remaining excessive power after deduction of electric power to be consumed in the electrochemical concentration cell, which however is yet alike in that electric power is consumed in an electrochemical concentration cell for carbon dioxide.

It is noted that, as the redox mediator of this invention, one may apply 2,6-di-tert-butyl-1,4-benzoquinone described in document (Scovazzo, P., Koval, C,. Noble, R., "Electrochemical Separation and Concentration of <1% Carbon Dioxide from Nitrogen," J. Electrochem. Soc., vol. 150, no. 5, pp. D91-D98, 2003), for example.

One may apply, as non-aqueous solvent, propylene carbonate, and as room temperature molten salt (ionic liquid), hexafluorophosphate-1-buthyl-3-methylimidazolium.

Figure 14:
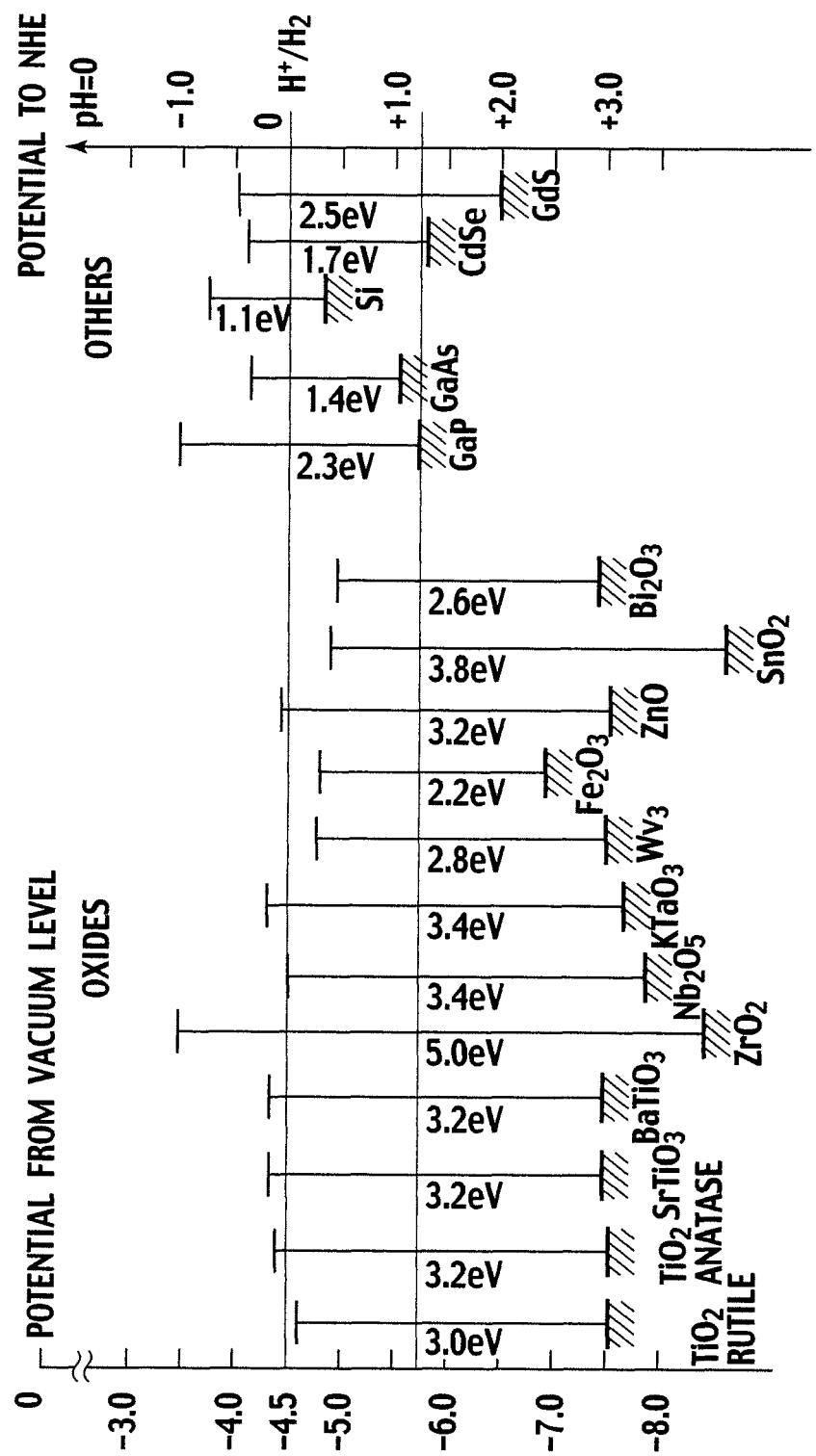
FIG. 14 is a graph showing band structures of various substances to be used as the photocatalyst.
Figure 15:
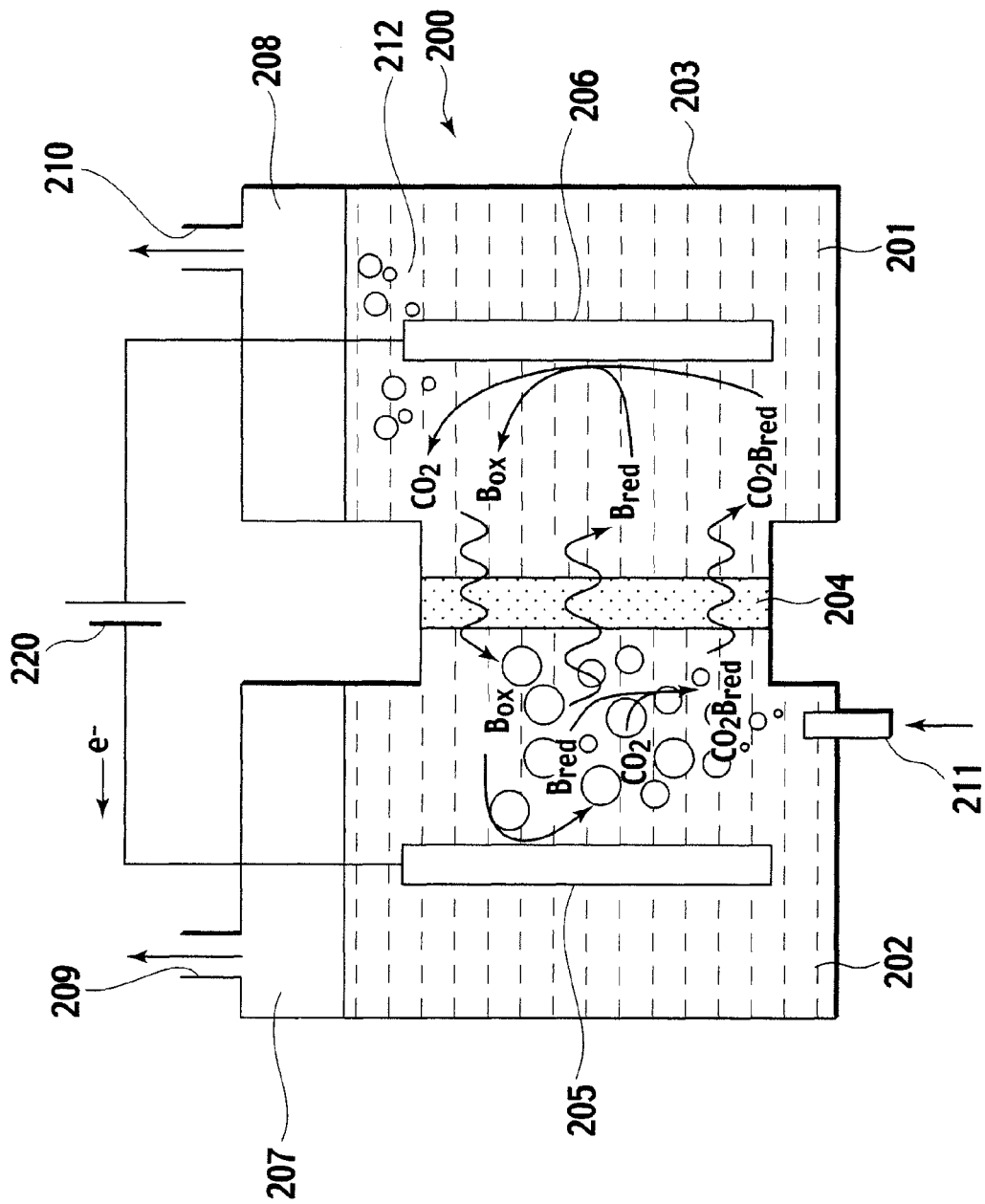
FIG. 15 is a schematic diagram of an electrochemical separation and concentration method for carbon dioxide in a conventional.

As photocatalyst constituting the photocatalyst layer 14, one may select a material having flat band potentials of valence band and conduction band, with oxidation/reduction potential of the redox mediator of carbon dioxide in between, from among semiconductors such as an oxide semiconductor to be, for example, titanium dioxide, iron oxide, niobium oxide, strontium titanate, barium titanate, tungsten trioxide, zinc oxide, tin dioxide, bismuth oxide, zirconia dioxide, sodium tantalate, or potassium tantalate, a compound semiconductor to be, for example, cadmium sulfide, cadmium selenide, gallium phophide, or gallium arsenide, or a monoatomic semiconductor to be silicon or germanium. Band structures of such substances are illustrated in a graph of FIG. 14, where an axis of ordinate at the left represents a "potential from vacuum level", and an axis of ordinate at the right represents a "potential to NHE (normal hydrogen electrode potential)". The photocatalyst layer 14 may preferably be formed as a porous film in which fine particles of grain sizes within a range of several nm to hundreds of nm are lined tight, with a film thickness within a range of sub-μm to 100 μm. Moreover, the photocatalyst may preferably have a light absorption characteristic adapted for a spectral matching to sunlight, such as by an impurity doping in a method such as by ion injection of an impurity element such as chromium, vanadium, or nitrogen, band gap control, or dye-sensitization using an organic dye or organometallic complex dye. Preferably, the fine particles should be fusion-bonded to an adequate degree for excited electrons, produced in the photocatalyst, to be transported to the collector layer 15 in an efficient manner without lost of activity. An assistant catalyst, such as RuO, may be added to lower the overvoltage in reaction for oxidation or reduction of redox mediator.

Although the collector layer 15 is not always necessary, the provision is desirable for excited electrons, produced in the photocatalyst, to be transported to an opposite electrode in an efficient manner without lost of activity. It is desirable for the collector layer 15 to be a material high of conductivity and transparent, such as a fluorine-doped ITO film (FTO film). For the collector layer 15, a uniform film, a porous member, or an assembly of conductive fibers also may be employed. It also is desirable for the collector layer 15 to have, on the electrolyte (ionic liquid 2) side, a surface covered with a semiconductor material identical to the photocatalyst or with a photocatalyst, to prevent occurrences of reverse reactions to formulas (7) and (8), i.e. reactions to be caused by electrons excited by light as shown by formulas (12) and (13) below, at the optical electrode 6, for prevention against reduction in quantum efficiency of absorbed light, efficiency of power generation, and efficiency of the separation and concentration of carbon dioxide.

$$CO_2B_{ox} + e \rightarrow CO_2B_{red} \quad (12)$$

$$B_{ox} + e \rightarrow B_{red} \quad (13)$$

(Second Embodiment)

Figure 2:
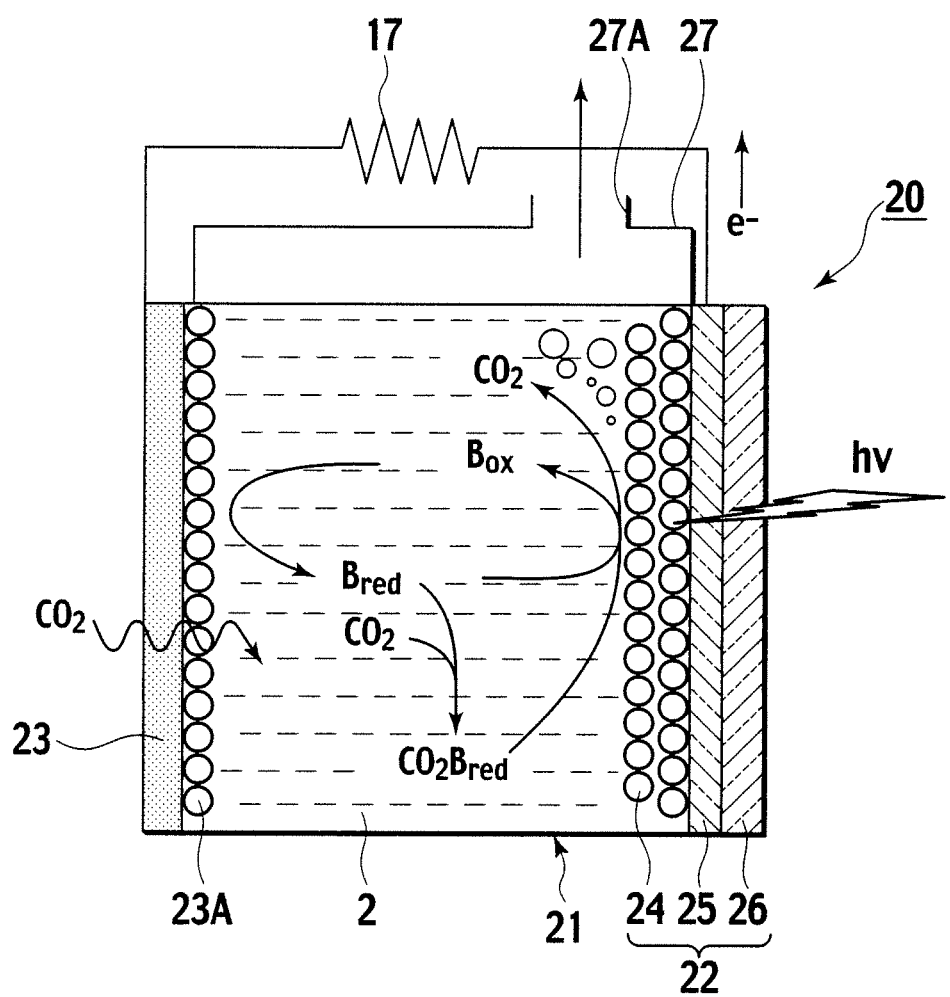
FIG. 2 is a sectional explanatory diagram schematically showing a general configuration of a photoelectrochemical cell according to a second embodiment of the invention.
Figure 3:
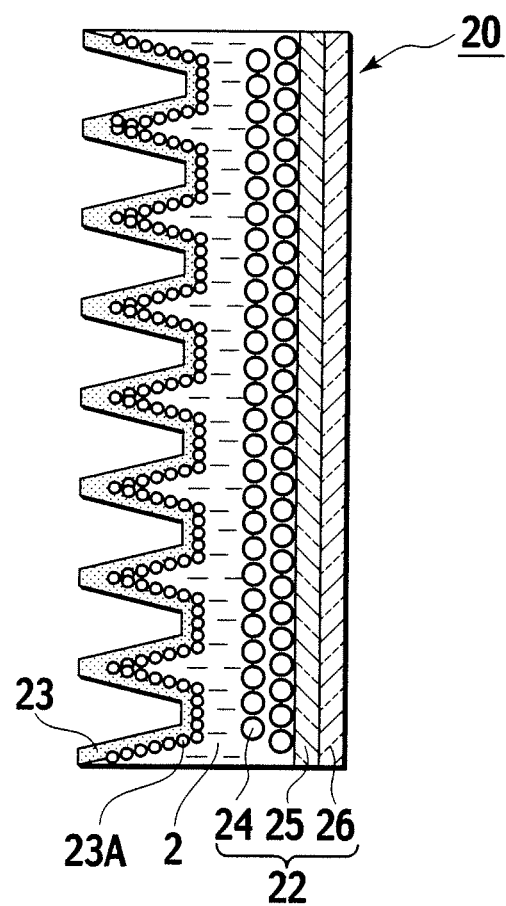
FIG. 3 is a horizontal sectional explanatory diagram schematically showing a general configuration of the photoelectrochemical cell according to the second embodiment of the invention.
Figure 4:
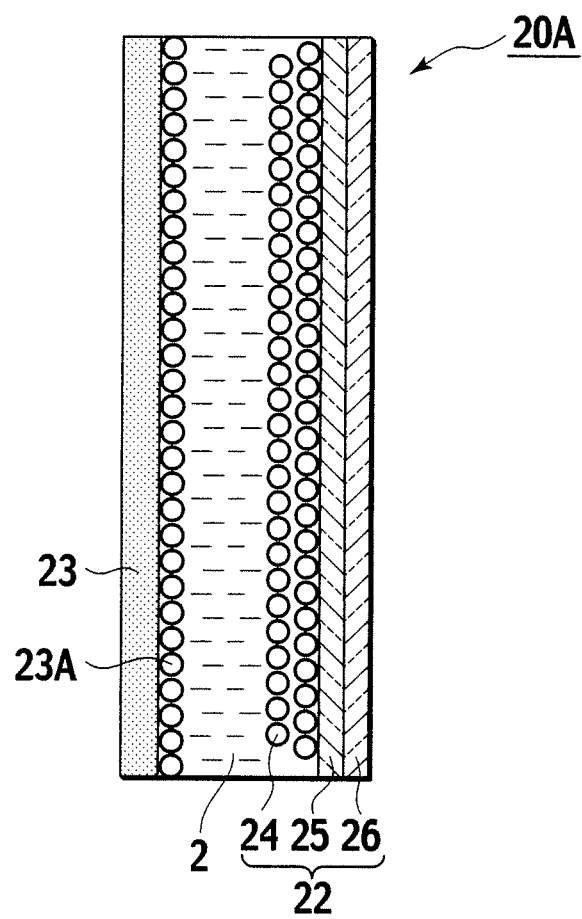
FIG. 4 is a vertical sectional explanatory diagram showing a modified example of the photoelectrochemical cell according to the second embodiment of the invention.

Description is now made of a photoelectrochemical cell according to a second embodiment of the invention, with reference made to FIG. 2 to FIG. 4.

As shown in FIG. 2, the photoelectrochemical cell 20 according to this embodiment includes an electrolyte container 21, an optical electrode 22, and a porous carbon electrode 23. The optical electrode 22 and the porous carbon electrode 23 concurrently serve as sidewalls of the electrolyte container 21 at mutually opposing positions. This embodiment is not configured with a partitioning membrane as in the photoelectrochemical cell 1 according to the first embodiment described.

The porous carbon electrode 23, made of carbon of a porous structure, is set to be impermeant to an ionic liquid 2, but permeable simply for gaseous bodies. This embodiment is configured to take in carbon dioxide of exhaust gases into ionic liquid 2, not by a bubbling of exhaust gases introduced into the ionic liquid 2, but by exposing an outside of porous carbon electrode 23 to exhaust gases to be diffused through the porous carbon electrode 23. In particular, in this embodiment, as illustrated in a horizontal section of FIG. 3, the porous carbon electrode 23 has a concavo-convex form zigzag-shaped for an increased contact area to exhaust gases.

The porous carbon electrode 23 has formed on the inside an electrode catalyst layer 23A made of a catalytic material, such as platinum (Pt).

The optical electrode 22 is formed, in order from inside, by a photocatalyst layer 24 made of a photocatalytic material that produces excited electrons and holes by light, a collector layer 25 for collecting excited electrons as they are produced in the photocatalyst layer 24, and a transparent glass plate 26 constituting a sidewall of the electrolyte container 23.

The electrolyte container 23 has a take-out port 27A formed in an upper wall portion 27 thereof, at the optical electrode 22 side.

It is noted that the outside of porous carbon electrode 23 may be arranged for exposure to the inside of an exhaust duct of exhaust gases, or may be disposed in a draft for collection of carbon diode from the atmosphere.

In this embodiment also, an external load 17 is connected between the optical electrode 22 end and the porous carbon electrode 23 end.

By such arrangement, the photoelectrochemical cell 20 according to this embodiment is allowed to have a simplified structure, reduced cost, and narrowed housing with enhanced freedom of installation. There is required no auxiliary equipment for sending air, nor power for auxiliary equipment, as additional advantage.

It is noted that, in this embodiment, the structure on the porous carbon electrode 23 side is shaped zigzag as illustrated in FIG. 3, but, vertically, not shaped zigzag as illustrated in a vertical section of FIG. 4, to thereby facilitate escape of generated bubbles. In an employable configuration, the electrode may be a shape of multiple cones that looks zigzag like FIG. 3 in both horizontal sectional view and vertical sectional view. An employable configuration may be planer, having optical electrode 22 and porous carbon electrode 23 parallel to each other, like FIG. 1 of the first embodiment, as a matter of course.

(Third Embodiment)

Figure 5:
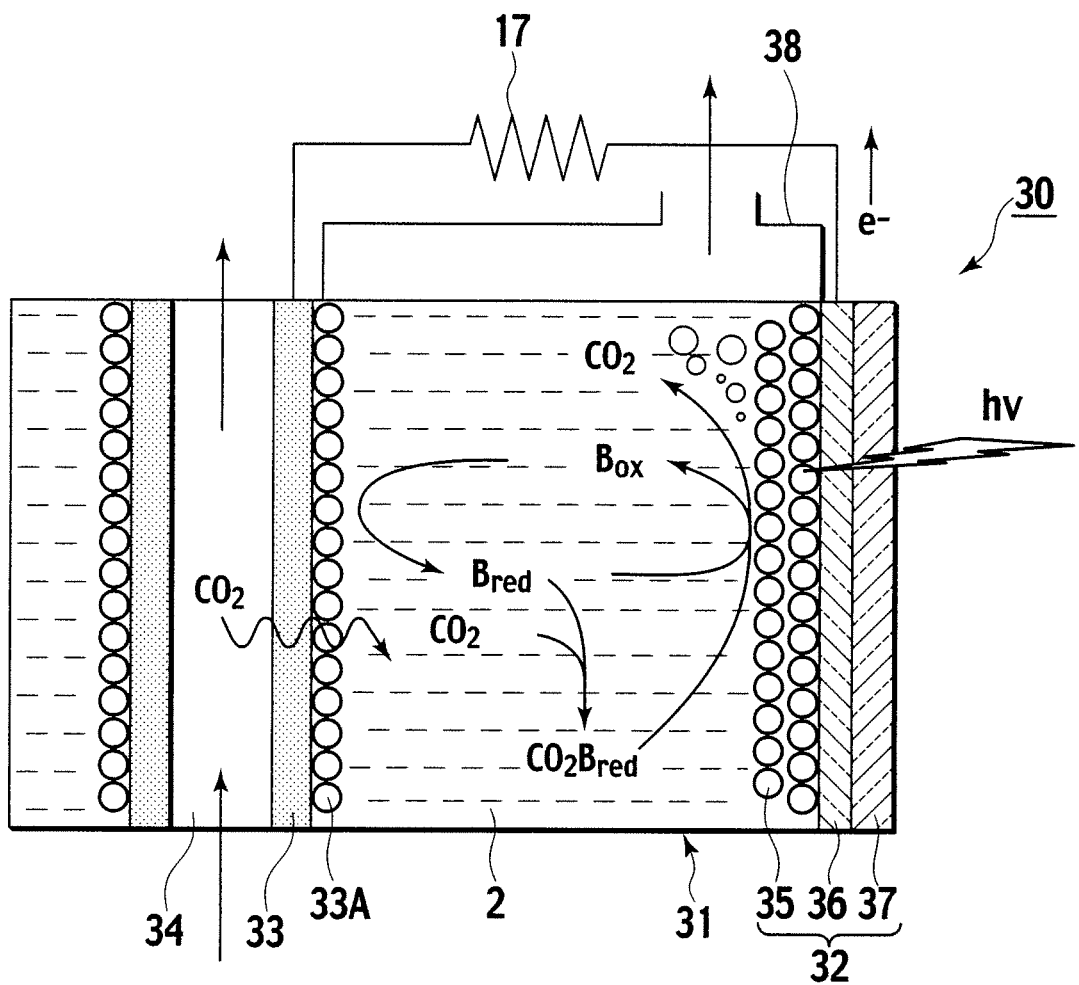
FIG. 5 is a sectional explanatory diagram schematically showing a general configuration of a photoelectrochemical cell according to a third embodiment of the invention.
Figure 6:
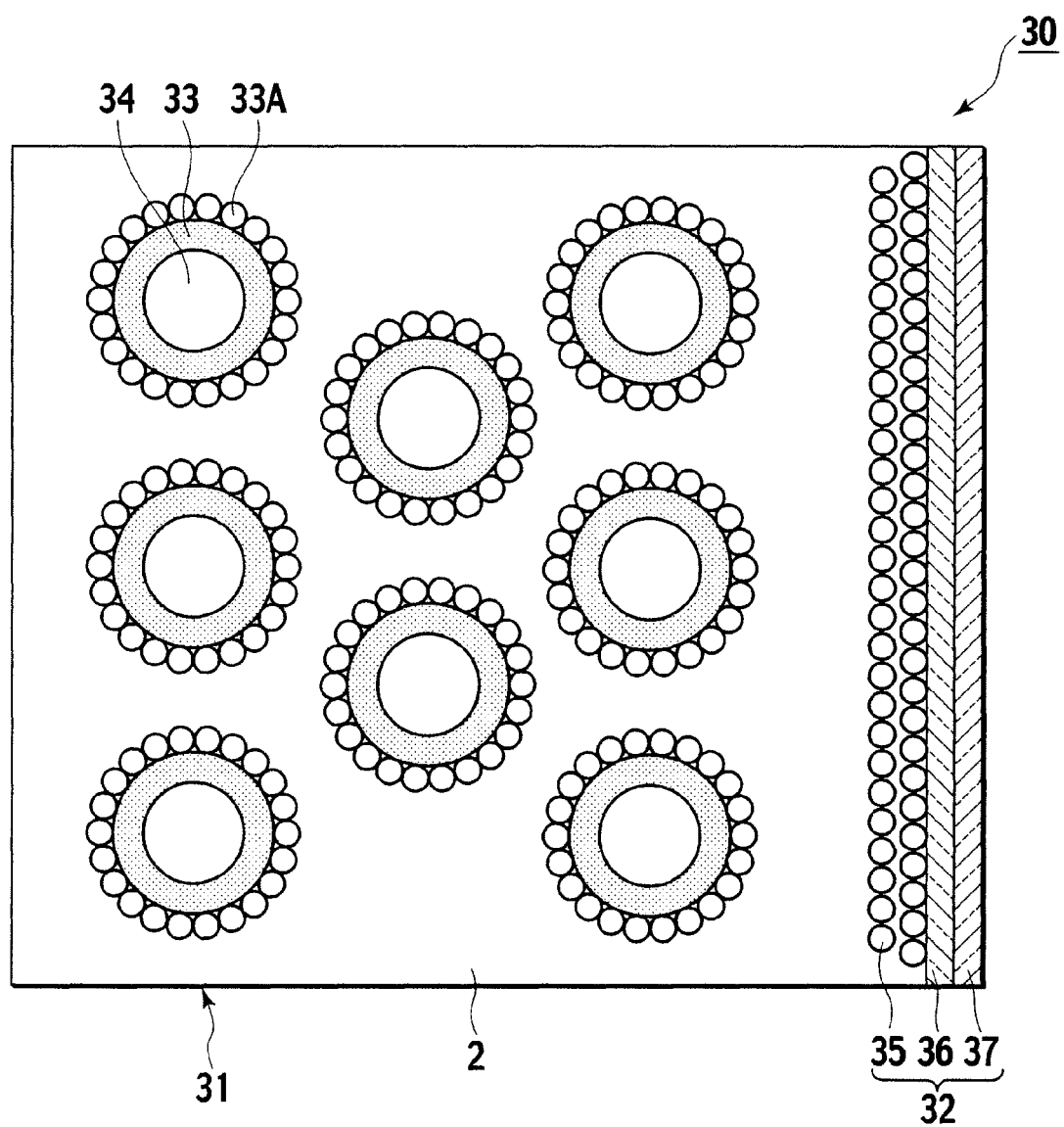
FIG. 6 is a horizontal sectional explanatory diagram schematically showing a general configuration of the photoelectrochemical cell according to the third embodiment of the invention.

Description is now made of a photoelectrochemical cell according to a third embodiment of the invention, with reference made to FIG. 5 and FIG. 6. According to this embodiment, the photoelectrochemical cell 30 is configured to be the photoelectrochemical cell 20 according to the second embodiment, as this is modified to have a porous carbon electrode formed cylindrical, and adapted to pass exhaust gases through a cylindrical hollow of the cylindrical porous carbon electrode.

As shown in FIG. 5 and FIG. 6, the photoelectrochemical cell 30 according to this embodiment includes an electrolyte container 31, an optical electrode 32 constituting part of a sidewall of the electrolyte container 31, and a porous carbon electrode 33 formed cylindrical so as to vertically extend through and within the electrolyte container 31. The porous carbon electrode 33 is disposed in a position set off from the optical electrode 32. This embodiment is not configured with a partitioning membrane as in the photoelectrochemical cell 1 according to the first embodiment described.

The porous carbon electrode 33, made in a cylindrical form by carbon of a porous structure, is set to be impermeant to an ionic liquid 2, but permeable simply for gaseous bodies. This embodiment is configured to take in carbon dioxide of exhaust gases into ionic liquid 2, not by a bubbling of exhaust gases introduced into the ionic liquid 2, but by passing exhaust gases through an exhaust gas flow path 34 that is a cylindrical hollow of the porous carbon electrode 33, thereby diffusing exhaust gases through the porous carbon electrode 33.

The cylindrical porous carbon electrode 33 has formed on the outside (that side which contacts ionic liquid 2) an electrode catalyst layer 33A made of a catalytic material, such as platinum (Pt).

The optical electrode 32 is formed, in order from inside, by a photocatalyst layer 35 made of a photocatalytic material that produces excited electrons and holes by light, a collector layer 36 for collecting excited electrons as they are produced in the photocatalyst layer 35, and a transparent glass plate 37 constituting the sidewall of electrolyte container 31.

The electrolyte container 31 has a take-out port 38A formed in an upper wall portion 38 thereof, at the optical electrode 32 side.

It is noted that the exhaust gas flow path 34 of porous carbon electrode 33 may do in air communication with a facility that discharges exhaust gases, or may be disposed in a draft for collection of carbon diode from the atmosphere.

Still in this embodiment, an external load 17 is connected between the optical electrode 32 end and the porous carbon electrode 33 end.

In this embodiment, which is not configured for bubbling exhaust gases, either, the flow resistance to exhaust gas flow can be reduced, allowing for an increased contact area between porous carbon electrode 33 and gases containing carbon dioxide, and an enhanced efficiency of absorption due to diffusion of carbon dioxide.

The porous carbon electrode 33, which is formed cylindrical in this embodiment, may have a circumferential wall of a concavo-convex shaped cylindrical form, allowing for an increased contact area to exhaust gases, as a matter of course.

(Fourth Embodiment)

Figure 7:
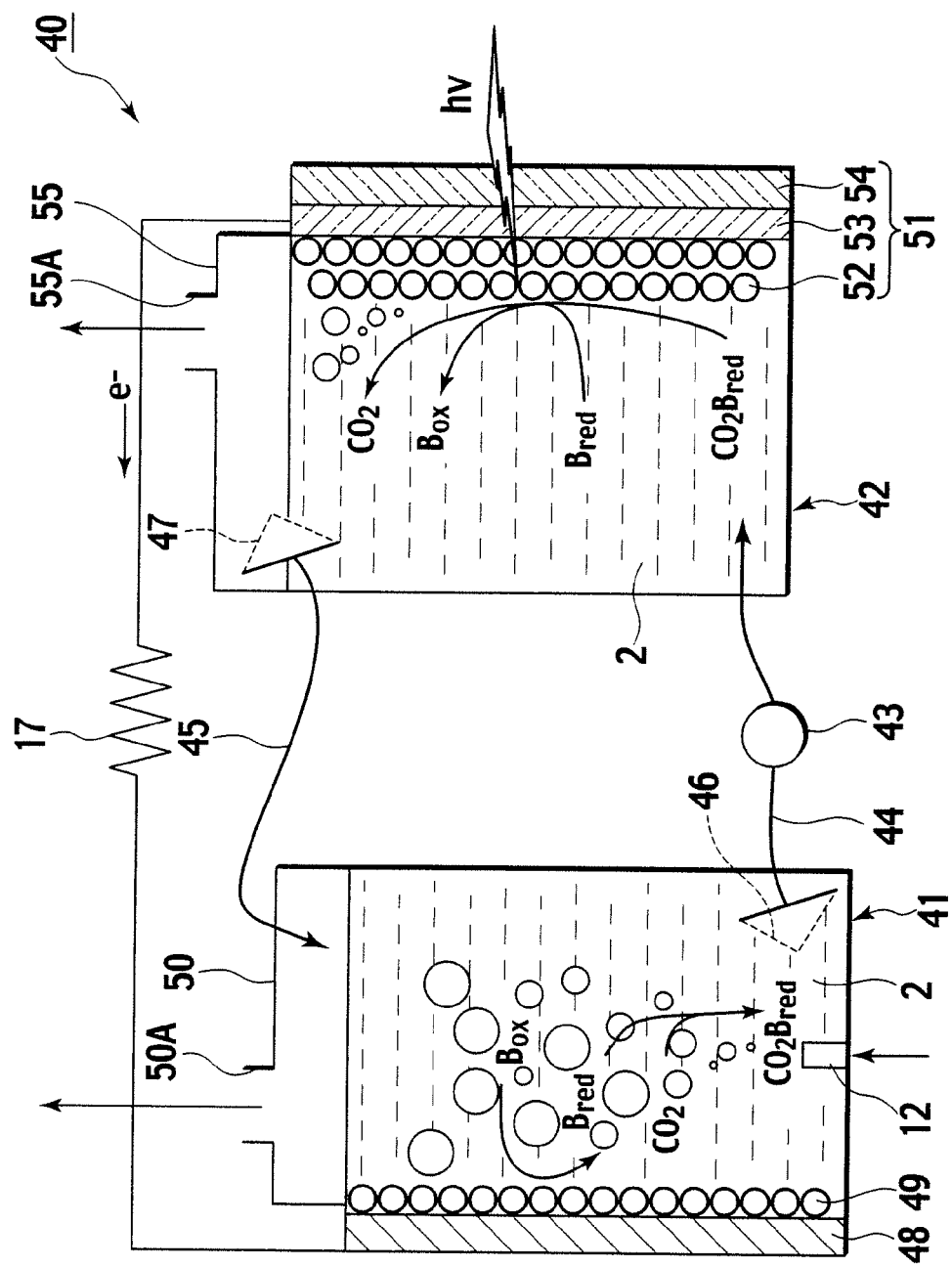
FIG. 7 is a sectional explanatory diagram schematically showing a general configuration of a photoelectrochemical cell according to a fourth embodiment of the invention.

Description is now made of a photoelectrochemical cell according to a fourth embodiment of the invention, with reference made to FIG. 7. This embodiment is configured to be a modification of the photoelectrochemical cell 1 according to the first embodiment described, as this is cut for separation into a $CO_2$ capturing chamber 7 and a $CO_2$ releasing chamber 8, and adapted by driving ionic liquid 2 in the $CO_2$ capturing chamber 7 with a pump, for transfer to the $CO_2$ releasing chamber 8, without use of partitioning membrane 4.

As shown in FIG. 7, the photoelectrochemical cell 40 according to this embodiment includes a first electrolyte container 41, and a second electrolyte container 42. To the first electrolyte container 41 and the second electrolyte container 42 is connected a transfer pipe 44 provided with a pump 43 for transfer of ionic liquid 2 from the first electrolyte container 41 to the second electrolyte container 42. Between upper parts of the first electrolyte container 41 and the second electrolyte container 42, an overflow pipe 45 extends to return ionic liquid 2, as it overflows at the second electrolyte container 42 where ionic liquid 2 is transferred, to the first electrolyte container 41.

The transfer pipe 44 has an end part thereof disposed in the first electrolyte container 41, which is provided with a filter 46 to prevent bubbles of exhaust gas from passing therethrough. The overflow pipe 45 has an end part thereof disposed in the second electrolyte container 42, which is provided with a filter 47 to prevent further passage of carbon dioxide, as this is concentrated by separation.

The first electrolyte container 41 has a carbon electrode 48 formed on a circumferential wall thereof, over the entirety or in part thereof. The carbon electrode 48 has an electrode catalyst layer 49 formed on the inside. The first electrolyte container 41 has an emission port 50A formed in an upper wall portion 50 thereof.

The second electrolyte container 42 has an optical electrode 51 formed on a circumferential wall thereof, over the entirety or in part thereof. The optical electrode 51 has a structure including a photocatalyst layer 52, a collector layer 53, and a glass plate 54 laminated in this order from inside. The glass plate 54 constitutes part of the second electrolyte container 42. The second electrolyte container 42 has a takeout port 55A formed in an upper wall portion 55 thereof, substantially above the optical electrode 51.

For other configuration, the photoelectrochemical cell 40 according to this embodiment has like arrangement to the photoelectrochemical cell 1 according to the first embodiment described.

This embodiment, configured for power supply to an external load 17, may be arranged for power supply to the pump 43.

Also the photoelectrochemical cell 40 according to this embodiment allows for like operations and effects to the photoelectrochemical cell 1 according to the first embodiment described. In particular, possible formation of electrode (carbon electrode 48 or optical electrode 51) on the inside of circumferential wall of the first electrolyte container 41 or the second electrolyte container 42 allows for an increased tendency for bubbled carbon dioxide to be captured by or separated from redox mediators.

(Fifth Embodiment)

Figure 8:
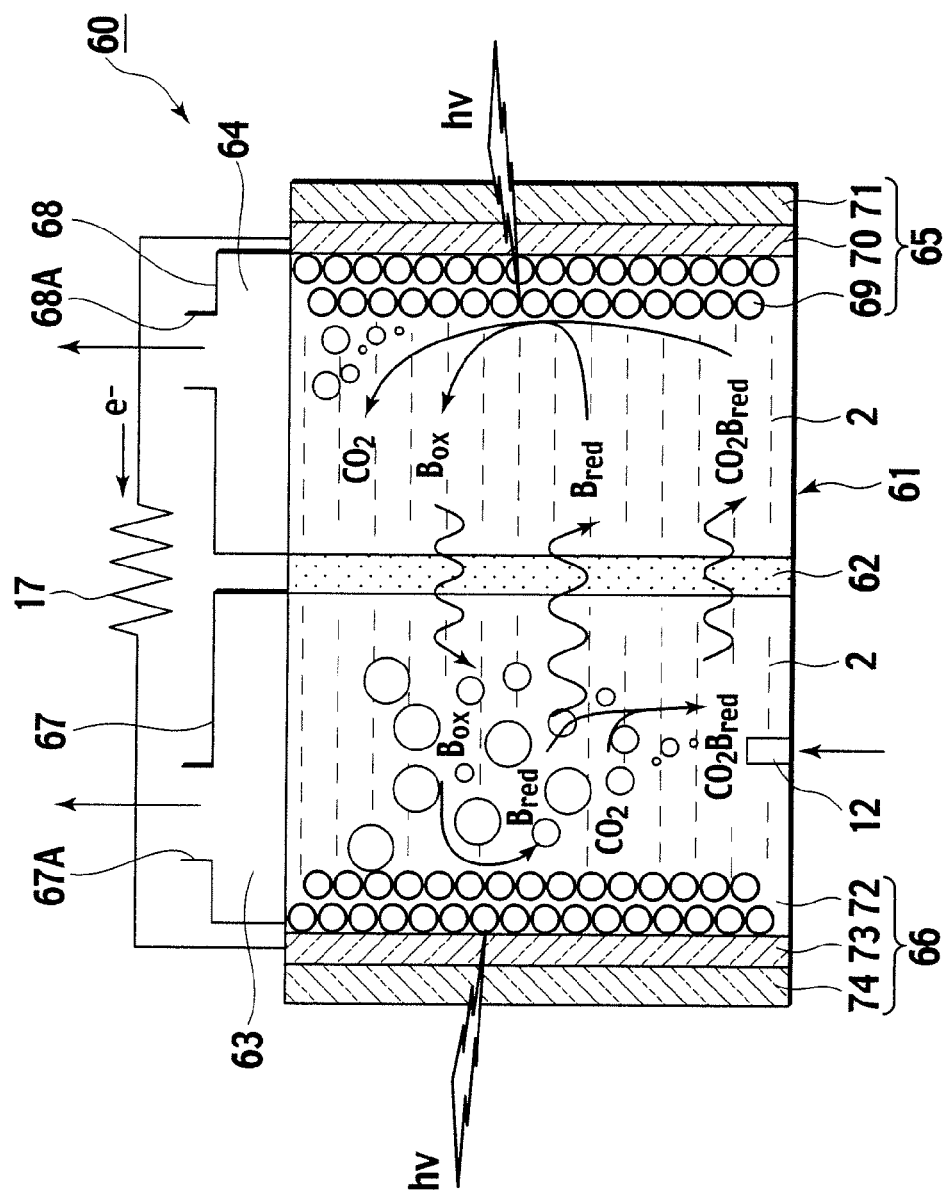
FIG. 8 is a sectional explanatory diagram schematically showing a general configuration of a photoelectrochemical cell according to a fifth embodiment of the invention.

Description is now made of a photoelectrochemical cell 60 according to a fifth embodiment of the invention, with reference made to FIG. 8. The photoelectrochemical cell 60 according to this embodiment is configured to be a modification of the photoelectrochemical cell 1 according to the first embodiment described, as the carbon electrode 5 is substituted with an optical electrode.

As shown in FIG. 8, the photoelectrochemical cell 60 according to this embodiment includes an electrolyte container 61 divided into a $CO_2$ capturing chamber 63 and a $CO_2$ releasing chamber 64, with a partitioning membrane 62 in between. The $CO_2$ releasing chamber 64 has a sidewall portion thereof opposing the partitioning membrane 62, and a first optical electrode 65 formed thereon, and the $CO_2$ capturing chamber 63 has a sidewall portion thereof opposing the partitioning membrane 62, and a second optical electrode 66 formed thereon.

The $CO_2$ capturing chamber 63 has an emission port 67A formed in an upper wall portion thereof, and the $CO_2$ releasing chamber 64 has a take-out port 68A formed in an upper wall portion 68 thereof.

The first optical electrode 65 includes a photocatalyst layer 69, a collector layer 70, and a glass plate 71 laminated in this order from inside. The second optical electrode 66 includes a photocatalyst layer 72, a collector layer 73, and a glass plate 74 laminated in this order from inside. The photocatalyst layer 72 of the second optical electrode 66 is adapted for reception of irradiated light to reduce an oxidant $B_{ox}$ of redox mediator B into a reductant $B_{red}$.

For other configuration, the photoelectrochemical cell 60 according to this embodiment is like to the photoelectrochemical cell 1 according to the first embodiment described.

Figure 11:
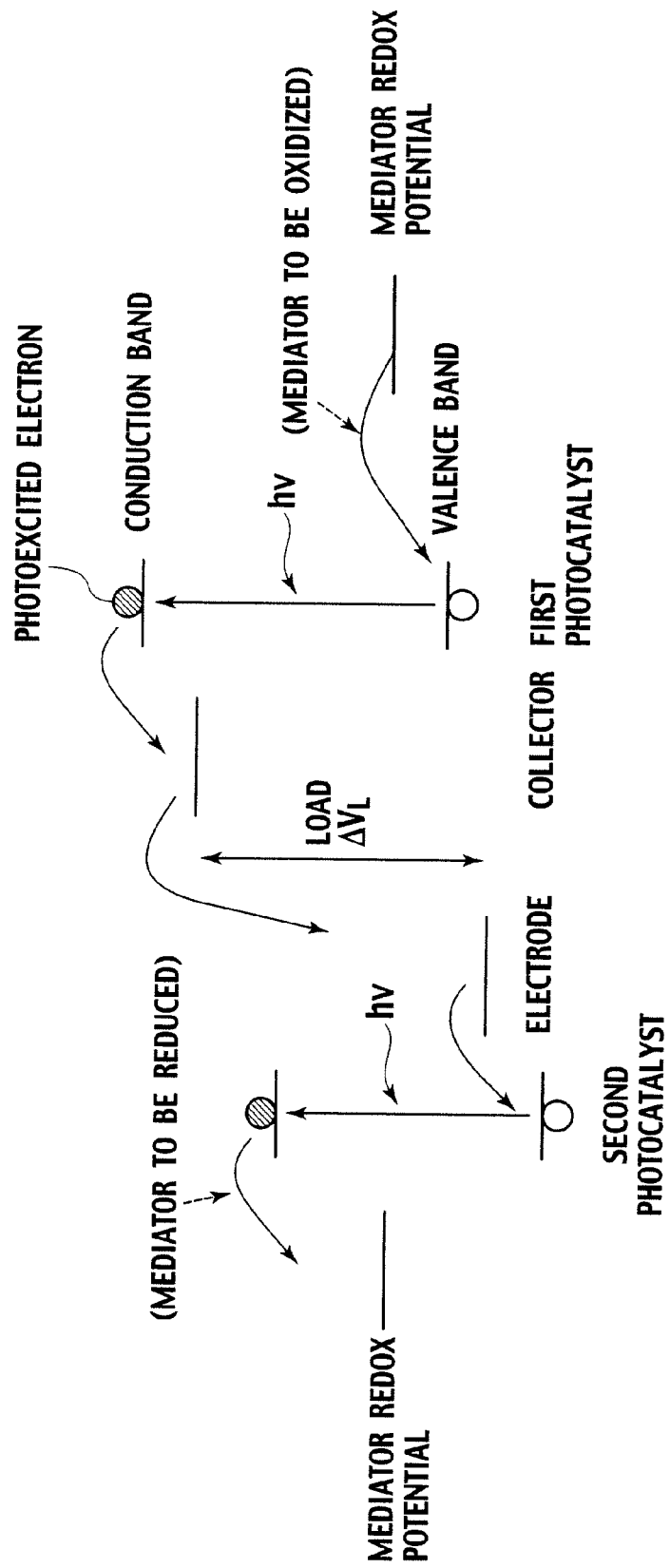
FIG. 11 is an explanatory diagram showing a flow of electron and energy levels in the photoelectrochemical cell according to the fifth embodiment of the invention.

This embodiment is adapted for an efficient reduction of oxidant $B_{ox}$ to reductant $B_{red}$ of redox mediator B by irradiation of light to the second optical electrode 66, allowing for an enhanced capture amount of $CO_2$. FIG. 11 is an explanatory diagram illustrating a flow of electron and energy levels in the photoelectrochemical cell 60 according to this embodiment.

In this embodiment, excited electrons are produced by light in the first optical electrode 65 serving for oxidation of redox mediator, and again excited by light in the second optical electrode 66 serving for reduction of redox mediator, allowing for an increased overvoltage taken for oxidation/reduction reaction of redox mediator, as an advantage for the optical electrode reaction to have an improved reaction speed.

(Other Embodiments)

Description and drawings constituting part of disclosure of the embodiments described should not be construed as limiting the invention. The disclosure will make apparent to artisan various substitute embodiments, examples, and techniques for application.

For instance, the foregoing embodiments are described as examples in which the redox mediator serving as a carrier for carbon dioxide has an inclined tendency to be bound to carbon dioxide as a reductant, and a declined tendency for the binding as an oxidant, and may employ a redox mediator that has, to the contrary, a declined tendency to be bound to carbon dioxide as a reductant, and an inclined tendency for the binding as an oxidant, assuming that an electrode chamber for absorption of carbon dioxide and an electrode chamber for release be configured contrary to the embodiments, as a matter of course.

The foregoing embodiments are described as examples in which the redox mediator serving as a carrier for carbon dioxide is oxidized at an optical electrode, and reduced at a normal electrode being no optical electrode, and may have a configuration in which, to the contrary, a redox mediator serving as a carrier for carbon dioxide is reduced at an optical electrode, and oxidized at a normal electrode being no optical electrode.

Figure 9:
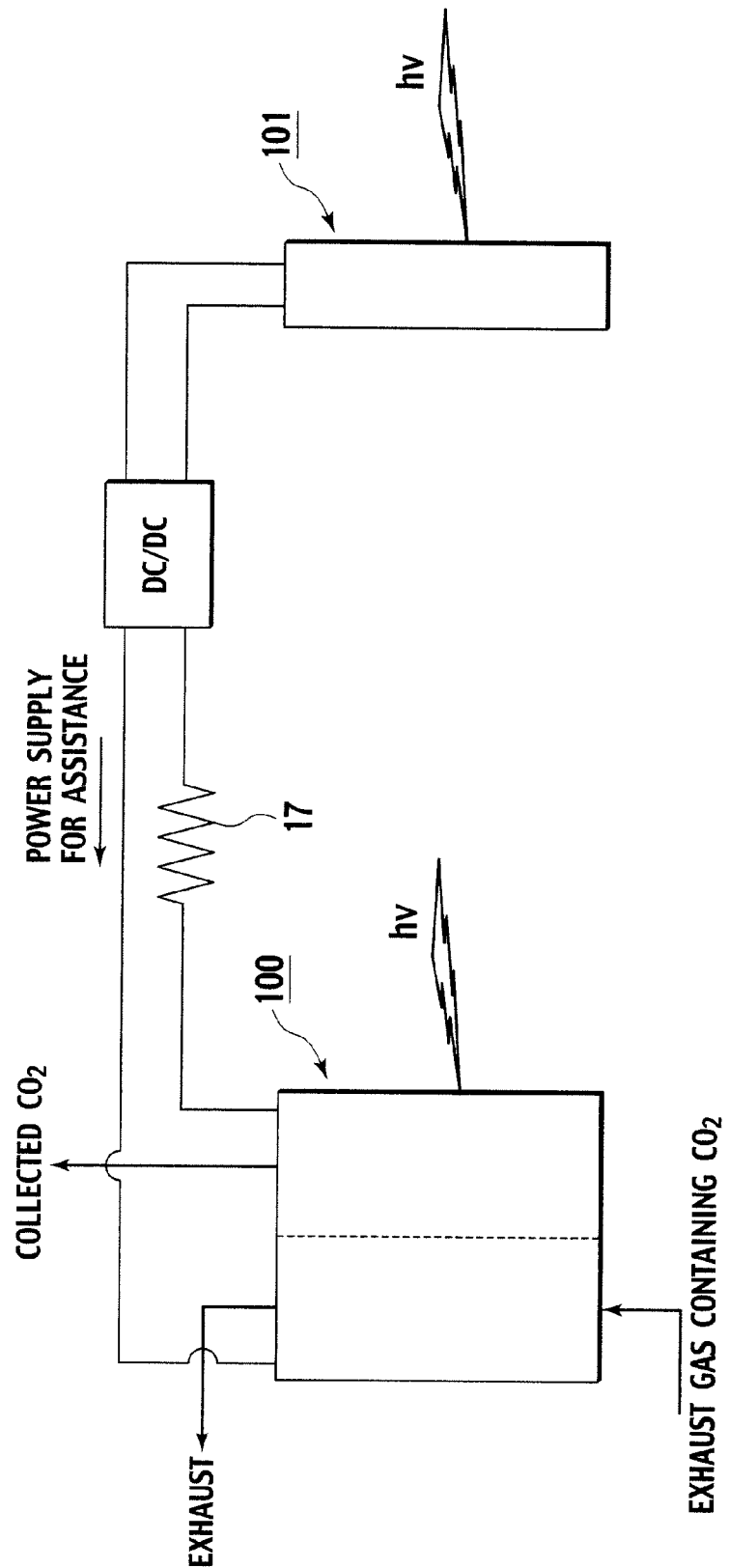
FIG. 9 is an explanatory diagram showing another embodiment of a photoelectrochemical cell according to the invention.

Further, in application of a photoelectrochemical cell according to the invention, as illustrated by FIG. 9, the photoelectrochemical cell 100 may have, for example, a solar cell 101 provided outside as an external power supply, and connected in series, for an assistance to electrode potential or overvoltage in oxidation/reduction of redox mediator. Providing the assistance by an external power supply, this renders available even an optical catalyst made of a material whose valence band and conduction band have their flat band potentials failing to interleave an oxidation/reduction potential of redox mediator in between.

In case of a very great parasitic resistance (as a cause of IR drop) or in case of a very great overvoltage in electrode reaction, actually to conduct of a current for collection of carbon dioxide, an increased fraction of power may be assisted by an external power supply for conduction of photoelectric current, resulting in consumption of the energy, even when the power consumption can be reduced in comparison with an electrochemical collection of carbon dioxide. According to the invention, as compared with the conventional example, both the redox cycle that contributes to the separation and concentration of carbon dioxide by the bonding of carbon dioxide and the redox cycle that rounds without bonding carbon dioxide have a basic effect of functioning to supply light energy absorbed in optical electrode 6, as electric energy for external use, allowing for a reduction of overall energy required for $CO_2$ collection, as an advantage in comparison with conventional techniques.

It is noted that the solar cell employed as an external power supply in the above description may be substituted with any external power supply, external commercial power supply, etc. that can serve for assistance to overvoltage or electrode potential, and provide a dc current.

Figure 12:
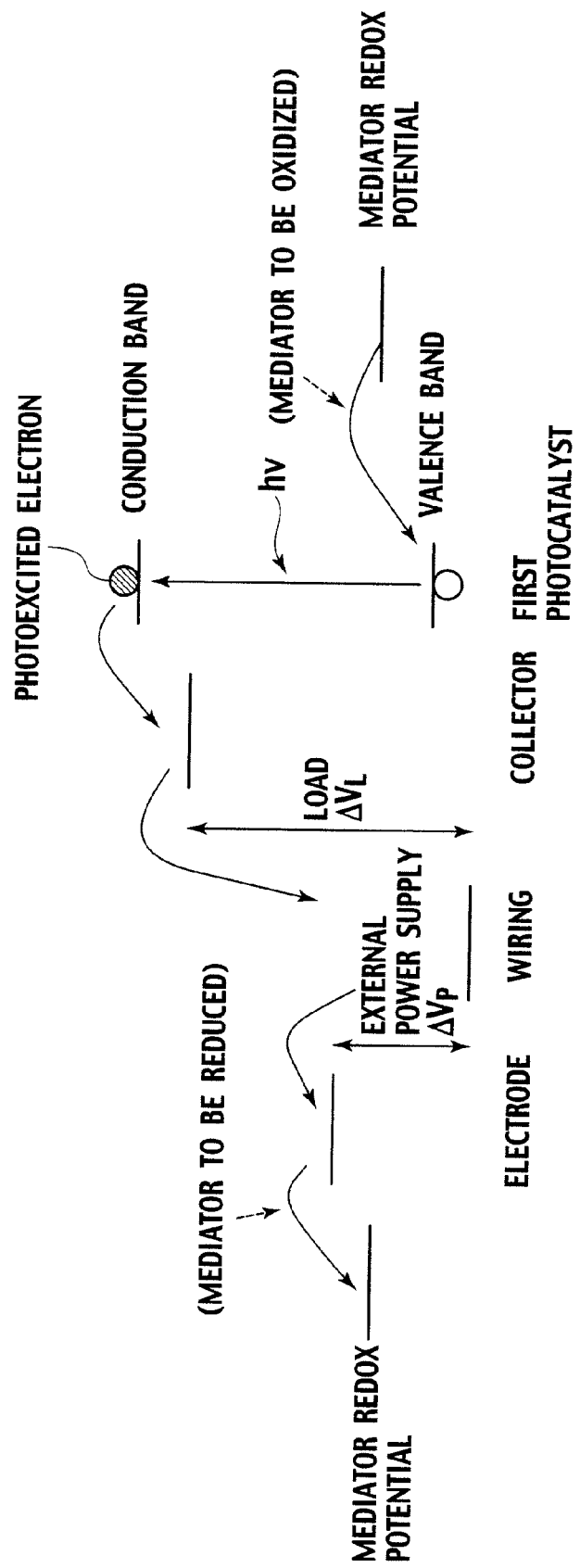
FIG. 12 is an explanatory diagram showing a flow of electron and energy levels in a case an external power supply (solar cell) is connected in series to a photoelectrochemical cell.

Solar cells 101 to be transparent may be laminated on the photoelectrochemical cell 100, as they are disposed upstream the photoelectrochemical cell 100 in the course of light irradiation, or the photoelectrochemical cell 100 may have an electrode fabricated by a transparent electrode so that the photoelectrochemical cell 100 is transparent, having solar cells 101 laminated on this cell 100, as they are disposed downstream in the course of light irradiation. In the case solar cells 101 are laminated upstream, they may preferably have a wide band gap (wide window for light irradiation), and in the case solar cells 101 laminated downstream, they may preferably have a narrow band. FIG. 12 is an explanatory diagram illustrating a flow of electron and energy levels in the case of solar cell (external power supply) connected in series.

It is desirable to select materials so as to absorb detrimental ultraviolet rays at the light irradiation side by glass plate or collector layer, or by photocatalyst layer, for preventing deterioration of redox mediator as a carrier for carbon dioxide or of ionic liquid. In the case the optical electrode is dye-sensitized for use, it is desirable to select materials so as to absorb ultraviolet rays by glass plate or collector layer, for preventing deterioration of sensitizing dye. In some cases, the glass plate may have an ultraviolet ray absorbing film put on the surface, or an ultraviolet ray absorbable glass, collector layer, or photocatalyst layer may be used.

Figure 13:
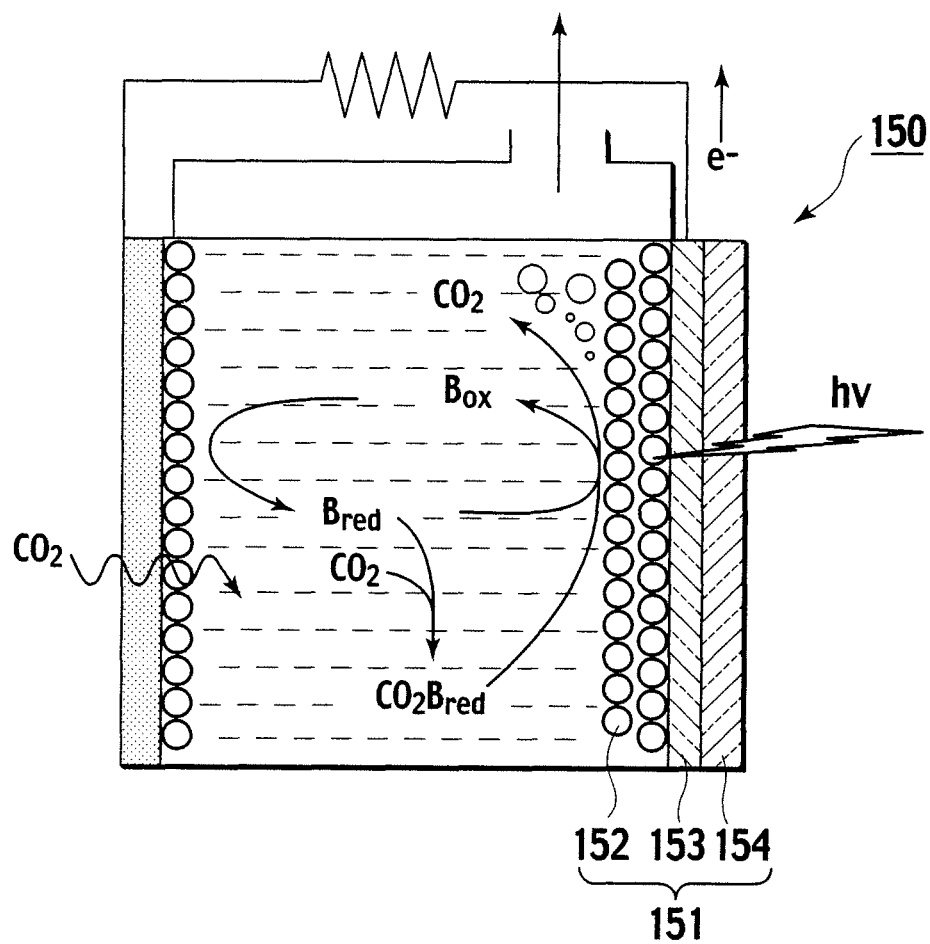
FIG. 13 is a sectional explanatory diagram schematically showing a general configuration of a photoelectrochemical cell according to another embodiment of the invention in which a photocatalyst is dye-sensitized.

Reference is now made to FIG. 13, which illustrates a photoelectrochemical cell 150 according to another embodiment of the invention. This cell 150 is configured like the cell 20 shown in FIG. 2, except for an optical electrode 151. The optical electrode 151 is made by a photocatalyst 152, a collector 153, and a glass plate 154. The photocatalyst 152 has an organometallic complex dye adsorbed on the surface, whereby the photocatalyst 152 is sensitized. The organometallic complex dye may be substituted with a suitable dye else.

An ionic liquid has been described as an example of a solvent of electrolyte, which however is not limited thereto, and may be an organic solvent or water, while in consideration of exposure to or passage of much volume of exhaust gases, it may preferably be a solvent having a low vapor pressure for the prevention of spread as vapor or loss in weight, or most preferably, an ionic liquid almost free of vapor pressure. A solvent high of solubility of carbon dioxide is desirable, to have an increased concentration of carbon dioxide at the electrode surface, resulting in an enhanced efficiency of separation and concentration of carbon dioxide.

Exhaust gases have been described as an example of a carbon dioxide containing gas, which however is not limited thereto, and may be any gas containing carbon dioxide, such as a ventilation gas of a greenhouse or tunnel, or in some cases, it may be a normal atmosphere itself.

A configuration with a glass substrate has been described as an example of optical electrode, which however is not limited thereto, and may be any translucent material, so that in some cases a resin may be used.

In the foregoing embodiments, a carbon electrode is employed as an electrode of a material for reducing a redox mediator serving as a carrier for carbon dioxide, which however is not limited thereto, and the electrode material to be employed may be of a variety of conductive material, such as a metal or oxide semiconductor. Further, platinum (Pt) has been described as an example of an electrode catalyst, which may be another noble metal, or may be absent if the electrode material itself is active.

In the foregoing embodiments, a photocatalyst layer provided to a light irradiation window has been described as an example, which however is not limited thereto, and may be provided on the $CO_2$ releasing chamber side of a porous partitioning membrane, together with a collector layer.

As a material of photocatalyst layer 14, one may employ an inorganic layered compound, a perovskite type compound oxide, an indium tantalate series material, etc.

The inorganic layered compound may be, for example, $HNbWO_6$, $H_4Nb_6O_{17}$, $H_2Ti_4O_9$, or the like.

The perovskite type compound oxide may be an oxynitride series, a fluorooxynitride series, or an oxysulfide series material. The oxynitride series may be, for example, $BaTaNO_2$, $Ta_3N_5$, $LaTaO_2N$, $LaTiO_2N$, $SrTaO_2N$, $CaTaO_2N$, $Li_2LaTa_2O_6N$, $CaLaTiON$, or the like. The fluorooxynitride series may be, for example, $TiNOF(TiN_xO_yF_z)$, or the like. The oxysulfide series may be, for example, $Sm_2Ti_2S_2O_5$, or the like.

The indium tantalate series material, etc. may be, for example, $InTaO_4$, $In_{1-x}Ni_xTaO_4$, $BiNbO_4$, $BiTaO_4$, $InNbO_4$, $Bi_2InNbO_7$, $Bi_2InTaO_7$, $Bi_2FeNbO_7$, or the like.

Industrial Applicability

A photoelectrochemical cell according to the present invention is applicable to an arbitrary system producing carbon dioxide, in particular for isolating by fixing carbon dioxide as a global warming countermeasure.

The invention claimed is:

1. A photoelectrochemical cell comprising:
   a container containing electrolyte in which a redox mediator is contained;
   at least one pair of electrodes mutually spaced to be in contact with the electrolyte, with at least one electrode thereof being an optical electrode having a photocatalyst configured for light irradiation thereon to produce an excited electron, and the optical electrode being adapted to convert light energy to electric power;
   an introducing portion, provided in the container, for introducing carbon dioxide directly into the electrolyte contained in the container; and
   a take-out port, provided in the container, for directly taking out carbon dioxide outside from the electrolyte contained in the container,
   wherein the redox mediator is a mediation chemical species such that an oxidant and a reductant thereof exhibit different bonding forces to carbon dioxide, the one exhibiting the higher bonding force carrying carbon dioxide, which is introduced from the introducing portion into the electrolyte, to the optical electrode, thereby allowing carbon dioxide carried to the optical electrode from an end of the other electrode of the at least one pair of electrodes to be taken out outside from the take-out port.

2. The photoelectrochemical cell as claimed in claim 1, wherein the electrolyte has a solvent comprising a nonaqueous solvent.

3. The photoelectrochemical cell as claimed in claim 1, wherein the electrolyte has a solvent comprising an ionic liquid.

4. The photoelectrochemical cell as claimed in claim 1, wherein a gas containing carbon dioxide is supplied in the electrolyte at an electrode side where the mediation chemical species is recovered.

5. The photoelectrochemical cell as claimed in claim 1, further characterized by a partitioning membrane for separation between the electrolyte at an electrode side where the mediation chemical species is recovered and the electrolyte at an electrode side where the mediation chemical species transfers carbon dioxide, and for ion conduction therebetween.

6. The photoelectrochemical cell as claimed in claim 1, wherein one electrode adapted for recovery of the mediation chemical species has a porous structure configured for prevention of permeation of liquid and for permeation of gas.

7. The photoelectrochemical cell as claimed in claim 6, wherein the electrode adapted for recovery of the mediation chemical species is configured to contact the electrolyte at one principal side thereof and to contact a gas containing carbon dioxide at the other principal side thereof.

8. The photoelectrochemical cell as claimed in claim 1, wherein the optical electrode is configured to shield ultraviolet rays striking to the photocatalyst.

9. The photoelectrochemical cell as claimed in claim 1, wherein the optical electrode comprises a photocatalyst film contacting the electrolyte, and a transparent collector film provided with the photocatalyst film, the photocatalyst film or the collector film having a light shielding effect.

10. The photoelectrochemical cell as claimed in claim 1, wherein the optical electrode is photosensitized with a light-absorbing dye.

11. The photoelectrochemical cell as claimed in claim 1, wherein a solar cell is electrically connected in series to the pair of electrodes.

12. The photoelectrochemical cell as claimed in claim 1, characterized by a solar cell laminated on the photoelectrochemical cell.

* * * * *